United States Patent
Koelle et al.

(10) Patent No.: US 6,425,839 B1
(45) Date of Patent: Jul. 30, 2002

(54) AUXILIARY GENERATOR SET WITH VARIABLE TRANSMISSION FOR AN INTERNAL COMBUSTION ENGINE

(75) Inventors: Gerhard Koelle, Wiernsheim; Peter Ahner, Boeblingen; Peter Glauning, Steinheim, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/381,321
(22) PCT Filed: May 4, 1998
(86) PCT No.: PCT/DE98/01215
§ 371 (c)(1),
(2), (4) Date: Sep. 16, 1999
(87) PCT Pub. No.: WO98/51524
PCT Pub. Date: Nov. 19, 1998

(30) Foreign Application Priority Data

May 9, 1997 (DE) .......................................... 197 19 213
Oct. 30, 1997 (DE) .......................................... 197 48 045

(51) Int. Cl.[7] ............................................... F16H 48/06
(52) U.S. Cl. ........................... 475/149; 475/5; 180/65.2
(58) Field of Search ............................. 475/149, 5, 10, 475/4; 180/65.2–65.4

(56) References Cited

U.S. PATENT DOCUMENTS 3,861,484 A * 1/1975 Joslin ......................... 180/65 A
4,411,171 A * 10/1983 Fiala ............................. 74/675
5,199,797 A * 4/1993 Burke ......................... 384/406
5,903,061 A * 5/1999 Tsuzuki et al. ................ 290/40
5,934,396 A * 8/1999 Kurita ......................... 180/65.2

FOREIGN PATENT DOCUMENTS

DE 197 30 858 A1 1/1998

* cited by examiner

Primary Examiner—Charles A. Marmor
Assistant Examiner—Tisha D. Lewis
(74) Attorney, Agent, or Firm—Michael J. Striker

(57) ABSTRACT

An electrical machine apparatus for starting an internal combustion engine and supplying voltage to an on-board electrical system of a motor vehicle having a main gear, includes an electrical machine, a planetary gear through which the electrical machine is coupleable to the engine, the electrical machine being switchable over from a motor mode to a generator mode, the gear being switchable over for adjusting an rpm of the electrical machine, the electrical machine being coupleable to a drive train of the engine via the gear so that for synchronizing the main gear, speed-changing stages in the gear and thus a moment of mass inertia of the electric machine are selectable in accordance with a desired rpm adaptation of the drive train.

10 Claims, 1 Drawing Sheet

AUXILIARY GENERATOR SET WITH VARIABLE TRANSMISSION FOR AN INTERNAL COMBUSTION ENGINE

BACKGROUND OF THE INVENTION

It is known that internal combustion engines in motor vehicles must be started with a starter device, because they cannot start on their own. To that end, typically electrically operated starter motors are used, which are connected to a voltage source via a starter relay, embodied as a so-called engaging relay. At the same time, for starting up, a pinion of the starter motor is brought into engagement with a gear ring, typically mounted on a flywheel of the engine. Once the engine is running on its own, the starter motor has to be disengaged, in order to prevent increased wear and major noise production. If for certain reasons the starter should remain constantly in engagement, then it must be designed for permanent operation even at relatively high rpm.

It is also known that internal combustion engines are typically equipped with a generator that constantly also runs; on the one hand the generator assures a permanent supply for the on-board electrical system and on the other it assures charging of the voltage source necessary for operating the starter motor. This generator is typically driven via the engine crankshaft by means of a v-belt or toothed belt. The generator outputs its rated output typically at a medium rpm, but it must be dimensioned such that even at an idling rpm of the engine, it can produce an adequate electrical output. At the same time, however, it must be designed for the maximum rpm of the engine and must also undergo adequate cooling. Cooling at relatively high rpm is usually done by air ventilation, which is supported by mounted fan blades. This leads to a pronounced undulation in the engine moment and to a mass inertia of the generator, which necessitates a drive via belts.

If the starter motor is to be operated simultaneously as a generator, then the problem first arises of designing it relative to rpm. In operation as a starter motor, a relatively high output at low rpm is needed, because the engine merely has to be started until it reaches its idling rpm. For reliable transmission of such high output, the aforementioned coupling with a pair of gear wheels on the engine side is chosen; this coupling is broken after the engine has started. The generator, however, must be in a position to assure an adequate power output over a wide and higher rpm range, yet without being exposed to the risk of overheating at maximum rpm. If the generator is to be designed for a higher electrical output, however, as is necessary for modern motor vehicles with many electrical consumers, such as control motors and servomotors, then the conventional belt drive rapidly runs up against the limits of its capability.

It is true that embodiments are known which provide simultaneous use of the generator as a starter as well, for instance in the form of a so-called dynastarter in motorcycle and motorbike designs of many years ago. Here, however, the generator had to produce only a very slight output, and therefore it could easily be operated in a range of lesser efficiency after the engine had started. For reasons of space, the generator was often located directly on the end of the crankshaft, where it ran at the engine rpm. The undulating nature of the moment was once again no problem, given the high-speed two-stroke engines typically used.

The older German Patent Application DE 196 29 839.3 also describes an internal combustion engine for motor vehicles, with a gear acting on the drive wheels of the motor vehicle, where a gear input shaft can be coupled to a power takeoff shaft of the engine, and having an electric machine which can be coupled to the gear via an intermediate gear and can be switched over to operate both as a starter motor for starting the engine and as a generator for supplying energy to an on-board electrical system of the motor vehicle. A disadvantage here, however, is once again the necessity of designing it as a starter motor with high torque at low rpm, which is simultaneously unfavorable for operation as a generator at higher rpm.

The object of the invention is therefore to develop a starter-generator machine for an internal combustion engine that can both furnish and reliably transmit adequate mechanical power on engine starting and furnish a sufficiently high electrical output in operation as a generator, when the engine is running at higher rpm.

SUMMARY OF THE INVENTION

Accordingly, it is an object of the present invention to provide a starter-generator machine which avoids the disadvantages of the prior art.

In keeping with these objects and with others which will become apparent hereinafter, one feature of present invention resides, briefly stated, in an electrical machine which can be coupled to an engine drive train via a gear in such a way that for synchronizing a main gear, the speed-changing stages in the gear and thus the moment of mass inertia of the electrical machine can be selected in accordance with the desired RPM adaptation of the drive train.

When the electrical machine is designed in accordance with the present invention it offers the advantage that because it is possible to adapt the rpm by means of a gear, the generator can always run in a range of high efficiency when the vehicle engine is running. Even at a low crankshaft rpm, a high electrical power output of the generator is thus assured, and thus the numerous electrical consumers in today's modern motor vehicles can be reliably supplied with energy, without the risk, for instance if the engine is idling for a long time in a traffic jam, of a slow discharge of the vehicle battery. At the same time, however, the electric machine can furnish the high-torque necessary for starting the engine, if the gear ratio is selected appropriately. For adjusting the rpm of the electric machine, a planetary gear is especially suitable, because of its uncomplicated design and ease of operation. Furthermore, such gears take up only very little space, and so in this case they can easily be integrated in the vehicle.

One advantageous feature arises from an additional idling position in addition to the preferably two variable speed-changing stages of the planetary gear. The disengagement lever can be put in a middle position, as a result of which the operative connection of the electric machine to the engine drive train can be interrupted. After the neutral position has been selected, the rotor of the electric machine slowly runs down. Such a switching position can be especially advantageous to achieve various fuel-saving operating states of the vehicle, such as a mode in which the electrical part of the generator does not also run. Since conventional generators are permanently driven at a constant gear ratio, they consume a certain quantity of additional fuel even when the consumers are turned off and the battery is completely charged. An additionally provided idling position in the planetary gear conversely allows a shutoff of the generator if the battery is charged and an interruption in the operative connection between the generator and the drive train. Such a switching position is also advantageous to protect the electric machine against an overload or overheating. For example at excessively high rpm or overly severe heating of the electric machine, the neutral position can be selected automatically, and as a result an effective overload protection can be achieved.

It is also advantageous in the machine of the invention that only one switching position of the planetary gear at a given time is possible. Compared with conventional versions with a magnetic clutch and a freewheel, the apparatus of the invention has the advantage that unintentional incorrect shifting, that is, selecting two gears at once, is possible. Furthermore, the gear wheels of the planetary gear are permanently in engagement with one another; that is, the switchover of the gear proceeds without disengagement of the gear wheels, so that additional synchronizing means can be dispensed with.

The machine of the invention also has the advantage of requiring only extremely slight additional energy. Since the selected switching position of the planetary gear at a given time and thus the gear ratio remain constant without any further energy being supplied from outside, an additional energy supply is necessary only at the moment of switchover of the gear ratio. This switchover energy can be brought to bear mechanically. However, electromagnetically, hydraulically or pneumatically actuated switchover devices are equally possible.

Because the starter and generator are spatially combined into a single component, the effort of construction and installation are also markedly reduced, which on the one hand has a cost advantage. Since the space required in the engine is also reduced, there is increased engineering freedom in positioning the engine in the vehicle along with its accessory systems. The conventional production systems and the know-how for producing starters and generators can continue to be used. Various components correspond unchanged to the present series of starters and generators.

It is also advantageous if the starter-generator machine of the invention is liquid-cooled which can be done by connecting it to the water cooling loop of the engine. Along with the embodiment shown with water cooling, an air- cooled version with its own or an additional cooling fan can also be realized.

Finally, it is advantageous if the starter-generator machine and in particular the switchable planetary gear are oil-lubricated, which can expediently be done by supplying them with the transmission oil of the shift transmission.

A further advantageous possibility for using the electric machine resides in reinforcing the gear synchronization. This can be done by means of targeted torque surges for acceleration or braking of the gear input shaft operatively connected to the electric machine. In this way, given a suitable dimensioned electric machine, the conventional synchronization in the shift transmission can be reinforced or can even be omitted entirely. However, that requires a marked oversize, since for additionally accelerating the gear input shaft at higher engine rpm, a considerable mechanical output must be brought to bear.

Further advantageous features of the invention will become apparent from the other characteristics, recited in the dependent claims.

DRAWINGS

The invention will described in further detail below in terms of exemplary embodiments in conjunction with the associated drawings.

DESCRIPTION OF THE EXEMPLARY EMBODIMENTS

Figure 1:
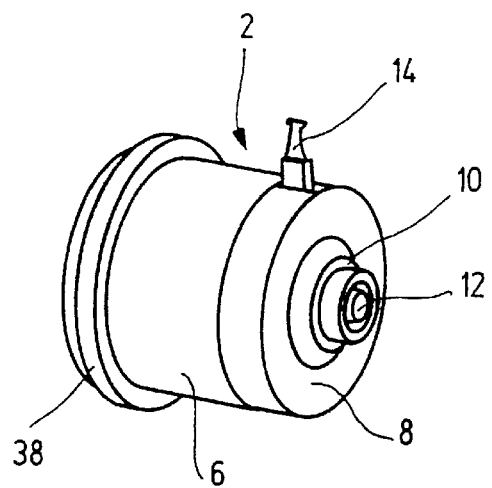
FIG. 1, a perspective overall view of the electric machine with gear transmission.

FIG. 1 shows a perspective view of an electric machine, which is surrounded by a substantially cylindrically embodied housing 6. A circular face end 8 of the housing 6 has a central passage 10 for a drive shaft 12 of a planetary gear 4 that is connected to the electric machine 2. A disengagement lever 14 extended radially to the outside can be seen on the outer jacket face of the cylindrical housing 6, near the face end 8. This disengagement lever 14 can be displaced in the axial direction and assures the selection of the desired gear ratio.

Figure 2:
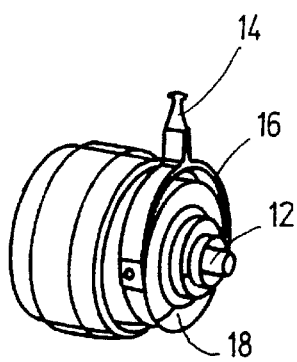
FIG. 2, a perspective view of the machine of FIG. 1, but without the outer housing.

FIG. 2 shows the electric machine 2 of FIG. 1 with the housing 6 taken off. This makes the forklike connection of the disengagement lever 14 particularly clear; this lever is fixed solidly to a hollow wheel 18 of a planetary gear and can thus assure the axial displaceability of the hollow wheel 18.

Figure 3:
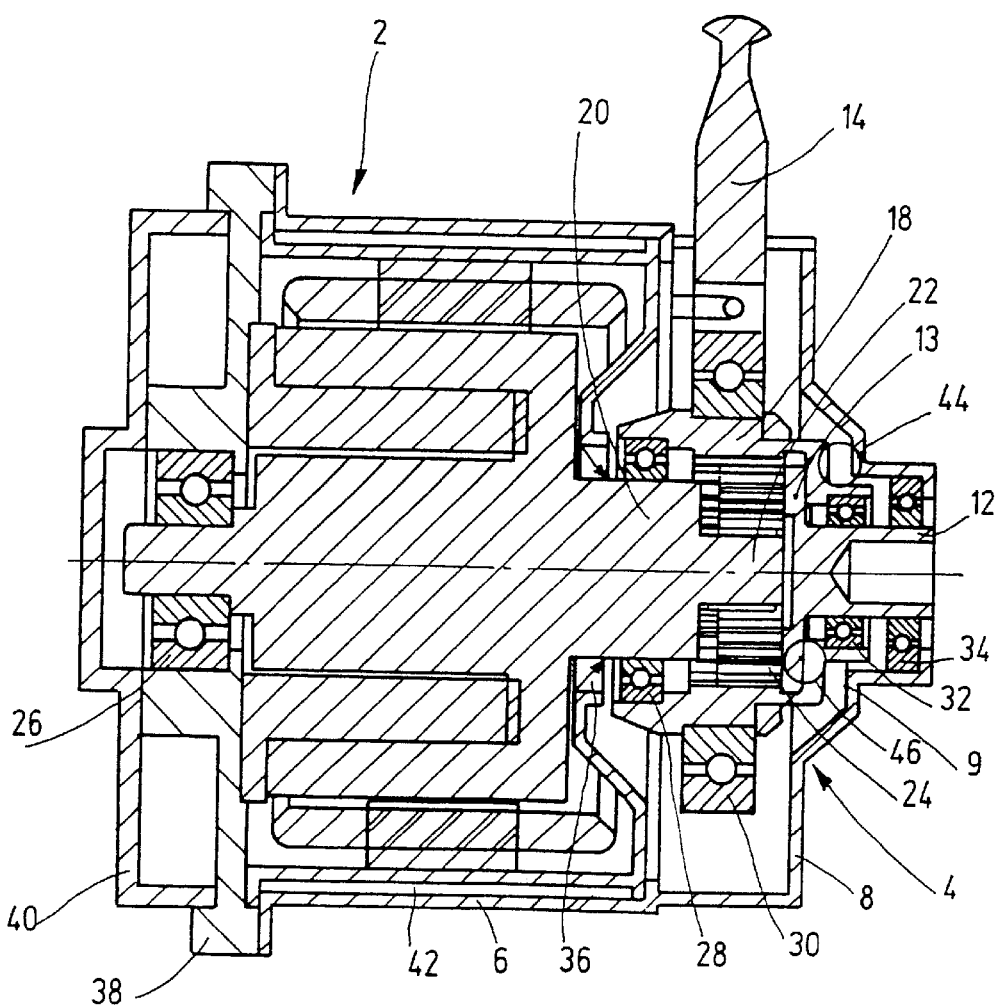
FIG. 3, a full sectional view of the electric machine with a planetary gear of FIG. 1.

FIG. 3 shows a full sectional view of the electric machine 2, provided with a planetary gear 4. Here the surrounding of the electric machine 2 and the planetary gear 4 with the housing 6 can be seen. On the side opposite the face end 8 of the housing, the housing 6 is open, so that the electric machine 2 and the planetary gear 4 remain accessible as needed. A flange 38 connected to the housing 6 and protruding past it in diameter acts as a rear housing cap and at the same time as a receptacle for the bearing of the rotor 20 of the electric machine 2 with a roller bearing 26. In order finally to close off the bearing from the outside and thus protect it against environmental influences, a further housing cap 40 is mounted on the flange 38. This housing cap 40 can be screwed to the flange 38 or secured with a snap ring. The planetary gear 4 on the one hand assures the operative connection of the electric machine 2 to the drive train of the motor vehicle, such as to a gear input shaft, not shown in detail here, of a main gear of the motor vehicle. The rotor 20 of the electric machine 2 is supported in two roller bearings 26 and 28. The bearing 26 on the left in terms of FIG. 3 is braced with its outer ring on the flange 38. These two roller bearings are indicated in FIG. 3 as deep groove ball bearings. However, a bearing with conical rollers or 4-point-contact ball bearings or similar bearing constructions is equally possible.

On one end, toward the planetary gear 4, the rotor 20 has toothing and thus at the same time acts as the central sun wheel 22 of the planetary gear 4. A plurality of planet wheels 24 mesh with this sun wheel 22 and also mesh with a hollow wheel 18 surrounding the planet wheels 24. The hollow wheel 18 is supported via two roller bearings, that is, a disengagement bearing 30 and a smaller bearing 32. The hollow wheel 18 also has a receptacle for the outer ring of the bearing 28, in which the rotor 20 is supported. The hollow wheel 18 is also connected to the disengagement lever 14 and is slightly axially displaceable, in order in this way to allow the speed-changing stages in the planetary gear 4 to be changed. Thus the hollow wheel 18 has two radial friction faces 44 and 46, which can either connect the planet wheel carrier 13, which is connected to the drive shaft 12, solidly to the hollow wheel 18, or can press the hollow wheel against the inner face end 9 of the housing and thus block it. If neither of these two friction faces 44 or 46 is closed, than the planetary gear 4 is in a neutral position, since in this position the sun wheel 22, planet wheels 24 and hollow wheel 18 can rotate freely. The rotor 28 of the electric machine 2 is not operatively connected in any way to the drive shaft 12.

The switchover of the planetary gear 4, or in other words the change in gear ratio, is done by axial displacement of the hollow wheel 18, via the disengagement lever 14 solidly connected to it. Below, the case will be described where the engine is running and the electric machine 2 is operating as a generator and is thus absorbing a mechanical torque from the engine. Upon contact of the hollow wheel 18 with the planet wheel carrier 13 via the friction face 46, the torque applied to the drive shaft 12 is transmitted, via the planet wheel carrier 13 operatively connected to the hollow wheel 18, to the sun wheel 22 and thus to the rotor 20 of the electric machine 2. The planet wheels 24 do not mesh with the sets of teeth of the sun wheel 22 or the hollow wheel 18 but rather revolve along with the hollow wheel 18, the planet wheel carrier 13 and the sun wheel 22, all at the same speed of revolution. The disengagement bearing 30 rotates idly at this time. The gear ratio of the planetary gear 4 in this position is i=2, for instance. The rpm of the rotor 20 of the electric machine 2 is the same as that of the drive shaft 12.

Upon an axial displacement of the disengagement lever 14, the hollow wheel 18 is displaced to the right together with the disengagement bearing 30. The actuation force for displacing the disengagement lever 14 can be brought to bear by a magnetically actuated relay, a hydraulic or pneumatic positioner, or in a similar way. Upon contact of the hollow wheel 18 with the inner face end 9 of the housing having the friction face 44, the hollow wheel 18 is blocked by the housing 6. The torque is transmitted by the drive shaft 12 to the planet wheel carrier 13, as a result of which the planet wheels 24 revolve and mesh with the hollow wheel 18 and the sun wheel 22. Since the hollow wheel 18 cannot revolve but instead is solidly connected to the housing 6, the planet wheels 24 transmit their torque to the sun wheel 22, which is solidly connected to the rotor 20 of the electric machine 2. In this operating position, the disengagement lever 30 is stationary. The gear ratio of the planetary gear 4 in this position is i=5, for instance. The rpm of the drive shaft 12 is stepped down, and is then, at the ratio i=1:5, the same as the rpm of the planet wheel carrier 13.

Finally, if the axial displacement travel is selected to be long enough, a middle position of the disengagement 14 can be provided, in which the hollow wheel 14 contacts neither the friction face 44 nor the friction face 46. The planet wheel carrier 13 revolves at the rpm of the drive shaft 12. The planet wheels 24 can rotate freely and they mesh with both the hollow wheel 18 and the sun wheel 22. However, since the hollow wheel 18 can rotate freely as well, no torque can be transmitted to the sun wheel 22 and thus to the rotor 20 of the electric machine 2. This middle position of the planet wheel 4 thus corresponds to a neutral position, in which the operative connection of the electric machine 2 to the drive train of the motor vehicle, such as the gear input shaft of the main gear, is interrupted.

What is claimed is:

1. An electrical apparatus for starting an internal combustion engine and supplying voltage to an on-board electrical system of a motor vehicle having a main gear, the electrical apparatus comprising an electrical machine; a planetary gear through which said electrical machine is coupleable to the engine, said electrical machine being switchable over from a motor mode to a generator mode, said planetary gear being switchable over for adjusting an rpm of said electrical machine, said electrical machine being coupleable to a drive train of said engine via said planetary gear for synchronizing the main gear, speed-changing stages in said planetary gear and thus a moment of mass inertia of said electrical machine are selectable in accordance with a desired rpm adaptation of the driven train.

2. An electrical apparatus as defined in claim 1; and further comprising mechanical switch means which actuate said planetary gear and are formed as means selected from the group consisting of mechanically actuatable means, electromagnetically actuatable means, hydraulically actuatable means and pneumatically actuatable means.

3. An electrical apparatus as defined in claim 1, wherein said electrical machine has liquid cooling and is connected to a water cooling loop of the engine.

4. An electrical apparatus as defined in claim 1, wherein said electrical machine has cooling fans providing air-cooling of said electrical machine.

5. An electrical apparatus as defined in claim 1, wherein said electrical machine has rpm-transmitting and bearing parts; and further comprising an oil loop provided in the main gear and actuating oil lubrication of said rpm transmitting and bearing parts and also of said planetary gear.

6. An electrical apparatus as defined in claim 4, wherein said cooling fan is a fan selected from the group consisting of an integrated cooling fan and an externally mounted cooling fan.

7. An electrical apparatus for starting an internal combustion engine and supplying voltage to an on-board electrical system of a motor vehicle having a main gear, the electrical apparatus comprising an electrical machine; a planetary gear through which said electrical machine is coupleable to the engine, said electrical machine being switchable over from a motor mode to a generator mode, said planetary gear being switchable over for adjusting an rpm of said electrical machine, said electrical machine being coupleable to a drive train of said engine via said planetary gear for synchronizing the main gear, speed-changing stages in said planetary gear and thus a moment of mass inertia of said electrical machine are selectable in accordance with a desired rpm adaptation of the driven train, said gear being a planetary gear which is switchable over mechanically, and having a final control element; and a mechanical switch means which is externally actuable and is coupled to said final control element of said planetary gear.

8. An electrical apparatus as defined in claim 7, wherein said planetary gear has at least two speed-changing stages.

9. An electrical apparatus as defined in claim 8, wherein said planetary gear has gear wheels which are permanently in engagement with one another.

10. An electrical apparatus as defined in claim 8, wherein said planetary gear, in addition to said at least two speed-changing stages has a neutral position in which an operative connection between said electrical machine and the drive train of the engine is interrupted.

* * * * *